United States Patent [19]

Smith

[11] 4,361,845

[45] Nov. 30, 1982

[54] DEVICE FOR PREVENTING THE CONTAMINATION OF INK JET COMPONENTS

[75] Inventor: Gordon J. Smith, Longmont, Colo.

[73] Assignee: International Business Machines Corporation, Armonk, N.Y.

[21] Appl. No.: 244,381

[22] Filed: Mar. 16, 1981

[51] Int. Cl.³ ...................... G01D 11/24; G01D 15/18

[52] U.S. Cl. ................................. 346/140 R; 346/75; 346/146; 101/1; 400/126

[58] Field of Search ................. 346/140 IJ, 140 R, 75, 346/25, 146; 101/1; 400/126

[56] References Cited

U.S. PATENT DOCUMENTS

| | | | |
|---|---|---|---|
| 3,854,399 | 12/1974 | Keur et al. | 346/75 X |
| 3,981,020 | 9/1976 | Takano et al. | 346/75 |
| 4,024,548 | 5/1977 | Alonso et al. | 346/140 R |
| 4,283,730 | 8/1981 | Graf | 346/140 IJ X |

OTHER PUBLICATIONS

IBM Technical Disclosure Bulletin, vol. 18, No. 9, Feb. 1976, pp. 2941–2942, "Oil Film Fog Collector and Fog Collector Treatment", K. E. Edds et al.

IBM Technical Disclosure Bulletin, vol. 16, No. 3, Aug. 1973, pp. 785–786, Ink 'Fog' Collector and Method for Protecting Charged Deflection Plates, D. R. Cialone et al.

IBM Technical Disclosure Bulletin, vol. 17, No. 8, Jan. 1975, p. 2256, "Ink Jet Gutter and Mist Shield", H. E. Lipp et al.

IBM Technical Disclosure Bulletin, vol. 17, No. 9, Feb. 1975, pp. 2622–2623, "Cassette Ink Jet Head", R. E. Pelkie et al.

IBM Technical Disclosure Bulletin, vol. 17, No. 10, Mar. 1975, pp. 3022–3022A, "Removal of Ink Mist in an Ink Jet Printer", C. A. Bruce et al.

*Primary Examiner*—S. D. Schreyer

*Attorney, Agent, or Firm*—Joscelyn G. Cockburn

[57] ABSTRACT

In an ink jet printing system wherein a drop generator emits ink droplets for printing on a recording media, deleterious ink mist or ink dust formed as a result of ink droplets impacting on the media is collected by a collecting container disposed relative to the zone whereat ink droplets contact the media. A vacuum system is coupled to the container and extracts ink mist which is returned to the ink supply system for reuse. Airborne contamination, to components such as the drop generator, charge electrodes and deflection electrodes, are prevented by encasing the components in a pressurized box.

16 Claims, 6 Drawing Figures

DEVICE FOR PREVENTING THE CONTAMINATION OF INK JET COMPONENTS

BACKGROUND OF THE INVENTION

1. Field of the Invention

The present invention relates to ink jet printers. In particular, the invention relates to an apparatus for collecting ink mist associated with the printers and, as a result, enhances the reliability of the ink jet printers. The invention further relates to devices used with such printers to eliminate the contamination of printer components.

2. Prior Art

The use of ink jet printers for printing information on recording media is well known in the prior art. Conventional ink jet printers may be either of the electrical or magnetic type. The electrical type printers incorporate a plurality of electrical components and fluidic components. The components coact to perform the printing function.

The fluidic components include a drop generator having a chamber for affecting drop inducing vibration on a printing fluid or ink, and a nozzle plate with one or more ink nozzles interconnected to the chamber. A gutter assembly is positioned downstream from the nozzle plate in the flight path of ink droplets. The gutter assembly catches ink droplets which are not needed for printing on the recording medium.

In order to create the ink droplets, an electrical transducer is disposed within the drop generator. The transducer vibrates at a frequency which forces thread-like streams of ink which are initially ejected from the nozzles to be broken up into a series of constant size ink droplets at a point within the vicinity of the nozzle plate. A charge electrode is positioned along the flight path of the ink droplets. The function of the charge electrode is to selectively induce a charge on the ink droplets as said droplets separate from the streams. A pair of deflection plates is positioned downstream from the electrodes. The function of the deflection plates is to deflect a charged ink droplet either into the gutter or onto the recording media.

The magnetic type printers include magnetic components and fluidic components. Since magnetic type ink jet printers are well known in the prior art, a detailed description will not be given. Suffice it to say that the various magnetic and fluidic components are configured in a manner substantially similar to the components of the previously described electrical type ink jet printers.

One of the most pressing problems associated with ink jet printers of the above-described type is system reliability. The reliability problem is the result of contaminants coacting with the various components of the ink jet printing system to adversely affect system performance. The contaminants are usually of two kinds; the so-called ink dust or ink mist and foreign matter such as paper dust, debris, etc. The latter kind of contaminants are often referred to as airborne contaminants.

As was pointed out above, ink jet printing results from controlled ink droplets impinging on the recording surface. The droplets are usually propelled at a relatively high speed towards the recording surface. As the droplets impact the surface, small particles break off from the ink droplets and diffuse in various directions. The small particles are often referred to as ink dust or ink mist. The ink mist permeates the entire ink jet printing system and attaches to the print drum, recording paper, drum sensor, deflection plates, charge plate and other components. As the ink mist accumulates on the electrical components, the electrical characteristics are affected and, as a result, the ink jet system operates erroneously or breaks down. Additionally, the ink mist tends to cause undersirable markings, such as streaking on the recording paper or surface.

In addition to the ink mist, external contaminants such as paper dust fibers, particles of dirt and other materials permeate the normal atmosphere or surroundings in which an ink jet system operates. The external contaminants tend to settle on the nozzle plate of the drop generator, the charge electrode and the deflection plates. Contaminants on the charge electrode and the deflection plates tend to affect the electrical characteristics of those components. Likewise, contaminants on the nozzle plates tend to clog the minute orifices through which ink is issued for printing on the recording surface.

U.S. Pat. No. 3,981,020 describes a device used in the prior art to solve the ink mist problem. The device consists of an electrode means which is arranged in a position suitable for substantially removing the diffused ink mist from the ink jet system printer with the use of a controlled electrostatic force. The electrode means is positioned relative to the deflection electrode at a predetermined distance away from the front surface of the recording paper. The electrode means is supplied with a controlled voltage. The voltage is of the same polarity as that of the charged ink mist. Since the charge on the electrode means and the charge on the ink mist are identical, an electrostatic repulsive force is developed between the ink mist and the electrode means. The force repels the ink dust towards the paper and away from the deflection plate.

It should be noted that the above-described apparatus is geared primarily to prevent ink mist from contacting the deflection electrodes. It does not afford protection to the other components of the ink jet printer system or prevent smudging of the recording paper.

U.S. Pat. No. 4,024,548 is another example of the prior art devices used to collect ink mist associated with an ink jet printer. The ink mist absorbing device consists of a laminated member mounted between the drum carrying the recording medium and the ink jet printer system. The laminated member is formed from two porous materials having different degrees of porosity. An opening is fabricated in the laminated member and the droplets are propelled through the opening. Ink mist reverberating from the recording surface is absorbed by the porous material facing said surface. It is worthwhile noting that the ink mist device is a passive device and has to be replaced periodically.

*IBM® Technical Disclosure Bulletin,* Vol. 17, No. 8, January 1975, Pg. 2256, describes a combined ink jet gutter and mist shield device. The device is formed by two blocks joined together by a pedestal. A plurality of ink collecting channels and conducting ducts are formed on one surface of the blocks. The opposite surface of the blocks is planar and acts as a mist shield to prevent ink mist from contaminating the printer components. An electrode may be plated on the planar surface to attract the ink mist as the mist reverberates from the recording surface.

*IBM*® *Technical Disclosure Bulletin,* Vol. 17, No. 9, February 1975, pgs. 2622–2623 describes a cassette ink jet head with an ink mist shield.

*IBM*® *Technical Disclosure Bulletin* Vol. 17, No. 10, March 1975, pgs. 3022–3023 describes the use of an absorbant wiper for cleaning the ink mist from the deflection electrodes.

*IBM*® *Technical Disclosure Bulletin,* Vol. 18, No. 9, February 1976, pgs. 2941–2942 describes a device for collecting ink splatter and paper dust. The device consists of a tank with a side wall extending upwardly to form a collecting plate. The orientation between the device and the ink jet printing system is such that the upwardly extending collection plate is disposed between the surface on which data is recorded and the other components of the printer. A wicking layer is disposed on the surface of the plate facing the recording surface. Oil from the tank permeates the layer. Ink splatter is collected by the oil soaked layer and is returned to the tank where it is separated from the oil and is collected into another tank.

SUMMARY OF THE INVENTION

It is therefore the object of the present invention to improve the reliability of an ink jet printing system by controlling airborne contaminants and ink mist in a more efficient manner than has heretofore been possible.

To this end, the present invention provides a mist-collecting vessel for collecting ink mist as it is generated by the droplets impinging on the recording paper. The collecting vessel is fabricated from an elongated multisurfaced member. At least one of the elongated surfaces is slanted relative to a planar surface. A cone-shaped, or truncated pyramid-shaped hole is bored in the member. The hole runs traversely to the lengthwise axis of the member and extends from the slant surface to the opposite surface. The member is mounted so that the base of the cone-shaped, or truncated pyramid-shaped hole is disposed in close proximity to the recording surface and in the same direction as the recording surface motion from the locus whereat ink droplets impinge on the recording surface. A suction means is coupled to the hole and pulls ink mist generated from droplets impinging on the recording surface. The ink may be returned to the reservoir for reuse.

In one feature of the invention, an absorbant layer is formed on the walls of the hole. Ink mist which is trapped in the layer is collected by a suction collecting means.

An environmental box having a base section and a removable top section is mounted to enclose the drop generator, charged electrodes, deflection plates and gutter assembly of the ink jet print system. A plurality of access openings are fabricated in the environmental box. One of the openings enables droplet streams to egress from the box. The other openings allow external means to contact the enclosed components. A means is provided to pressurize the box so that airbound contaminants is excluded and do not contact the components.

In another feature of the invention, the mist-collecting vessel is mounted on the surface of the environmental box which faces the recording media.

In yet another feature of the invention, a centrifugal fog collector is disposed in close proximity to the recording surface and downstream from the zone whereat ink droplets impinge the recording surface in the direction of media movement. The fog collector is formed from a cylindrical tube with end members fastened to both ends of the tube. Air escape holes are bored in the end members. A traverse longitudinal slot is machined in the tube. A deflecting blade or plate is fastened to one side of the slot. The fog collector is disposed so that the deflecting blade is adjacent to the recording surface. As the recording surface is rotated by a supporting means such as a rotating drum, a gaseous boundary layer is generated. The gaseous layer which includes the ink mist is collected into the centrifugal fog scoop. The circular geometry of the tube forces the gaseous mixture to follow a circular path. As such, the trapped air moves towards the center of the tube and escapes from the end holes. The heavy ink falls to the side of the tube and is extracted through a drain hole or recirculated to the ink supply tank.

The foregoing and other features and advantages of the invention will be apparent from the following more particular description of the preferred embodiment of the invention, as illustrated in the accompanying drawings.

DETAILED DESCRIPTION OF THE PREFERRED EMBODIMENT

Figure 1:
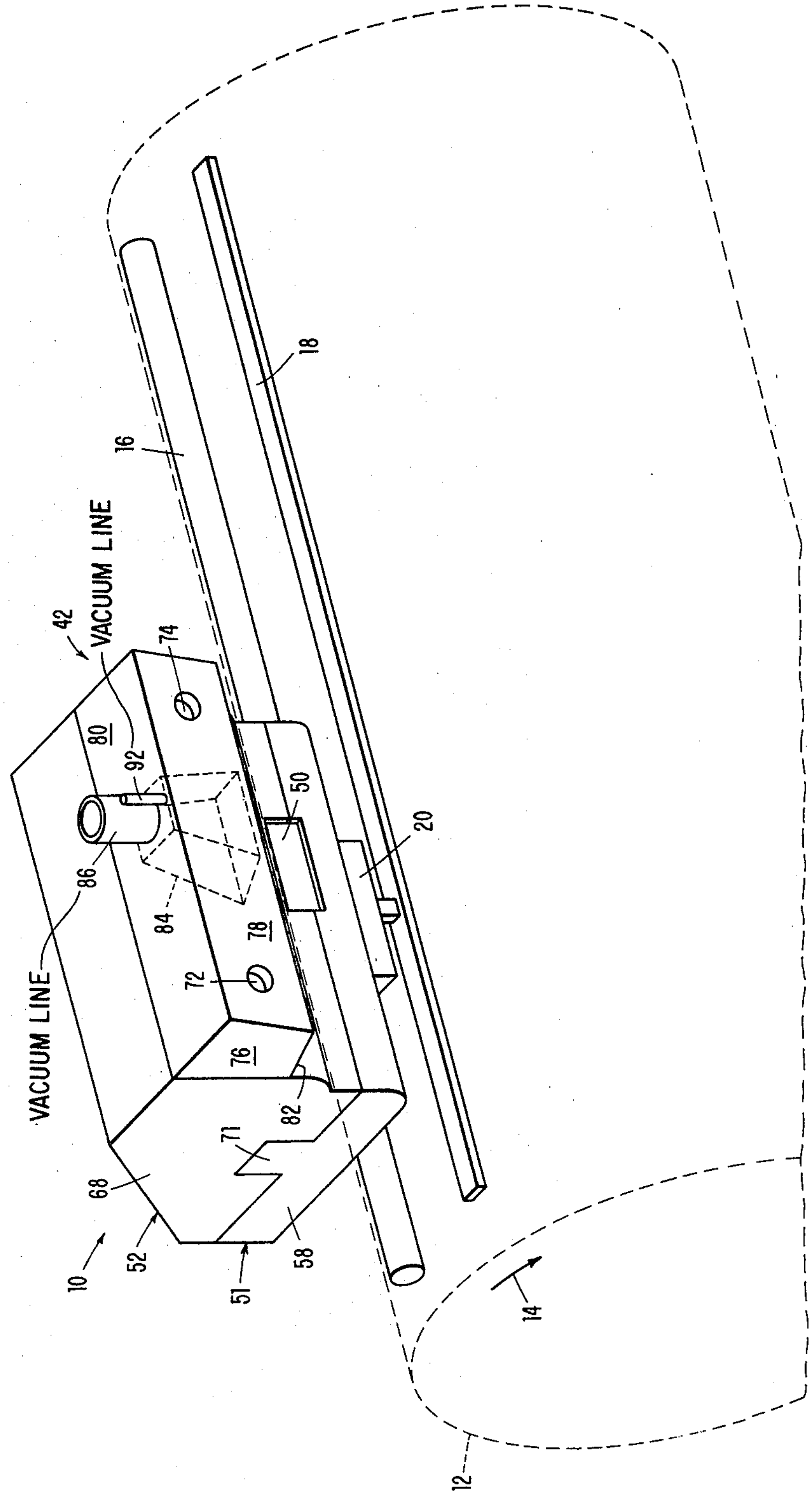
FIG. 1 shows an isometric view of the contamination prevention device according to the teaching of the present invention.
Figure 2:
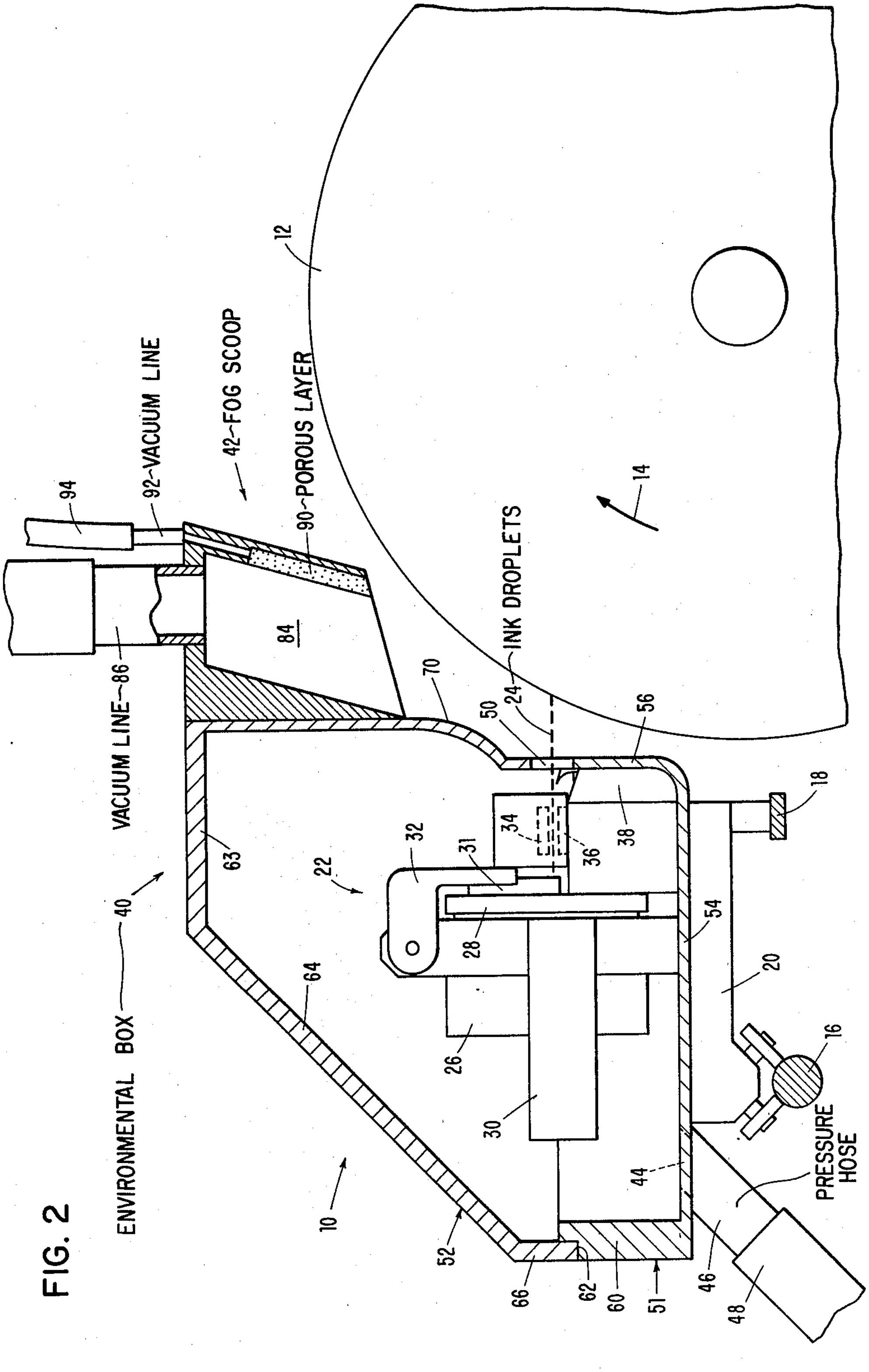
FIG. 2 shows a cross section of the device of FIG. 1.

Turning now to the drawings, particularly FIGS. 1 and 2 show an ink jet printing system with a contamination prevention device 10 embodying the teaching of the present invention. Since ink jet printing systems are well known in the prior art, the details of such a system will not be described hereinafter. As such, description will be limited to those features of the ink jet printing system which is necessary for the understanding of the invention. In FIGS. 1 and 2, common elements will be identified by the same numeral. The ink jet printing system includes a drum 12 which is mounted for rotation in a direction shown by arrow 14. A recording sheet (not shown) is fixedly attached to the surface of drum 12. The rotating drum may be of the type described in Application Ser. No. 191,582 entitled "Rotary Drum For Processing Sheet Materials" and assigned to the assignee of the present invention. A slide bar 16 and a guide rail 18 are positioned in spaced relationship to the rotating drum and with respect to each other. The slide bar 16 and the guide rail 18 run parallel with the longitudinal axis of drum 12. A carriage assembly 20 rides along the slide bar and the guide rail and transports a printing assembly 22 relative to the longitudinal axis of the drum. As the printing assembly is transported along its path, one or more droplet streams of ink 24 is emitted therefrom. The droplet streams of ink impinges on the sheet (not shown) riding on the surface of the rotating drum to print data thereon. Since this type of print assembly is well known in the art, detail will not be given herein. Suffice it to say that print assembly 22 includes a drop generator 26. A nozzle plate 28 having a plurality of minute openings is fastened to the drop generator 26. The drop generator is fitted with a cavity (not shown) in which a crystal is mounted. A valve 30 controls the entry of a conductive printing ink from an ink supply reservoir (not shown) into the cavity. When the crystal is excited with an appropriate signal, the minute streams of ink which are extruded through the minute openings in the nozzle plate are broken up into ink droplets downstream from said nozzle plate. As the droplets are detached from the minute streams, a charge electrode assembly 31 charges the droplets. The charge electrode 31 is supported by pivotal bracket 32. A pair of deflection plates 34 and 36, respectively, are deposited downstream from the charge electrode. Droplets emerging from the charge electrode assembly are deflected into gutter assembly 38 or traverses in droplet stream 24 for printing on the media. By way of example, Application Ser. No. 215,468 U.S. Pat. No. 4,331,964 entitled "Dual Cavity Drop Generator" and assigned to the assignee of the present invention describes a print assembly which can be used for printing in the embodiment shown in FIGS. 1 and 2. As stated previously, as droplets impinge on the paper, pieces of the print fluid breaks off and forms a mist which contaminates the components of the system and smudges the printing paper. Additionally, airborne contaminants such as debris, paper dust, etc. are present in the environment and tend to create problems such as clogging the minute openings in the nozzle plate. The present invention describes a device which solves all contamination, be it ink mist or ink dust or airborne contaminants.

Still referring to FIGS. 1 and 2, the contamination prevention device according to the teaching of the present invention includes an environmental box 40 and a fog scoop 42. Although the drawings in FIGS. 1 and 2 show the fog scoop integrally mounted to the environmental box, this should not be construed as a limitation on the scope of the present invention. It should be noted that either the environmental box or the fog scoop can be used individually since each of the devices is designed to protect the system from contamination arising from different sources. By way of example, the fog scoop corrects ink mist or ink dust contamination while the environmental box corrects contamination due to airborne contaminants such as paper dust, etc.

Still referring to FIGS. 1 and 2, the environmental box is configured as a closed enclosure about printing assembly 22. As is evident from the drawings, all of the components of print assembly 22 are encased by the environmental box. The environmental box is fixedly mounted to carriage assembly 20 and as the head is transported along its predetermined path, the environmental box is transported therealong. As such, the member elements of the print assembly 22 are protected by the enclosure. A hole 44 is fabricated in the environmental box. A rigid pipe 46 is fitted in the hole. A flexible hose 48 couples the pipe to a pressurizing system (not shown). The length of hose is selected so that the head assembly and the environmental box is transported along the predetermined path without undue restraint by said hose.

In operation, a positive pressure is applied from the pressurizing system (not shown) to the environmental box. The positive pressure is such that any airborne contaminants such as paper dust or foreign bodies, etc. which attempt to enter through the openings in the environmental box are forced out. An elongated slot 50 is fabricated in the side of the environmental box which faces the support drum. The function of the slot is to enable print droplets to escape from print assembly 22. As stated previously, the droplets are used for printing on the recording sheet carried by the rotating drum.

Although the enclosure, hereinafter called the environmental box which is used to cover the print assembly 22 may take various shapes and forms, in the preferred embodiment of this invention, the environmental box is a dual section box. The box includes a base section 51 and a cover section 52. The base section 51 and the cover section 52 are configured into interlocking relationship to form a closed enclosure covering the print assembly 22. The base section 51 has a substantially rectangular shape. The base section includes a bottom member 54. The bottom member is fabricated from a relatively thin sheet of rectangular material. The rectangular sheet is bent along one of its lengthwise dimensions to form a side wall member 56. The side wall member extends upwardly from the base or bottom portion of the base section. A notch is formed in side wall member 56. As will be explained subsequently, the notch forms the lower portion of opening 50. A plurality of planar sections, two of which are shown in FIGS. 1 and 2 and identified with numerals 58 and 60, respectively, are fastened to each other and to bottom member 54. The configuration is such that the side wall members extend upwardly from the bottom member 54. The upwardly extending side wall members are fabricated from a material having a thickness greater than the material from which the bottom member 54 and side wall member 56 is made of. Each of the side wall members extend for an equal distance above the top surface of bottom member 54. The side wall member 58 is fitted with a male locking portion which extends upwardly above the height of the other side wall members. As will be explained subsequently, this male locking member coacts with a female-like opening in the cover section 52 which forms a locking assembly for holding the base section 50 and the cover section 52 in secure engagement.

Except for extending side wall member 56, a groove 62 is fabricated on the top surface and around the periphery of the side wall members. As will be explained subsequently, the cover section 52 of the environmental box is fitted with side members extending downwardly. The downwardly extending side wall members mates with the peripheral groove 62 to form part of the locking assembly which enables the firm coupling between the base section and the cover section of the environmental box. In the preferred embodiment of this invention, the base section 50 of the environmental box is fabricated from an aluminum material. Of course, it is within the skill of the art to select another lightweight material without departing from the scope of the present invention.

Still referring to FIGS. 1 and 2, the cover section 52 of the environmental box is fabricated from two planar top members 63 and 64, respectively. The planar top member 63 is configured at an angle relative to planar top member 64. A plurality of side members, two of which are shown in the drawings and identified as side members 66 and 68, respectively, are joined to the planar top members 58 and 60, respectively. Side wall member 68 is fitted with an opening. As was stated previously, the opening in side wall member 68 coacts with the projection 71 extending upwardly from side wall member 58 to form the locking mechanism which locks the base section 50 and the cover section of the environmental box together. As can be seen in the figures, the side wall members extend downwardly from the planar top members 63 and 64, respectively. In the preferred embodiment of this invention, the cover section 52 of the environmental box 40 is fabricated from a clear plastic material. The various members or sections are joined together by an adhesive. Of course, it is within the skill of the art to fabricate the cover section from other materials without departing from the scope of the present invention. A curved frontal section 70 is also fastened to the planar top member 63. The frontal section 70 is fabricated from a metal having a thickness substantially equivalent to the thickness of bottom member 54. A hole is fabricated in the frontal member 70. The hole coacts with the hole in side wall member 56 to form opening 50. As was stated previously, opening 50 allows ink droplets to be ejected from print assembly 22.

Still referring to FIGS. 1 and 2, fog scoop 42 is fastened by a plurality of screws (not shown) to the environmental box 40. Access to the screws are achieved through openings 72 and 74, respectively. As was stated previously and as will be shown in some of the alternate embodiments to be described hereinafter, the fog scoop and the environmental box need not be arranged as is shown in FIG. 1 and in FIG. 2. The fog scoop may be mounted relative to the zone whereat ink droplets stream 24 coacts with the print drum. In such a configuration, the fog scoop captures ink dust generated by droplets impinging on the print media. Likewise, the environmental box can be mounted to enclose the print assembly only. In that configuration, it protects the print assembly 22 from airborne contaminants and also from ink dust coacting with the components that affect the reliability of the system.

The fog scoop 42 is fabricated from a solid elongated block material. The block material includes a plurality of external planar surfaces identified by numerals 76, 78 and 80, respectively. Surface 82 is cut at a slant with respect to the rotating drum. The surface is slanted in the direction of rotating drum 12. Stated another way, a straight line which is drawn tangential to the drum 12 at the point where ink drops are placed on the recording medium would intersect the slanted surface 82. A traverse opening 84 is bored through the solid block material. The opening extends from the slant surface 82 through the opposite surface 80. A tube 86 is fitted in the opening. A flexible hose (not shown) is coupled between the cube and a vacuum system (not shown).

In operation, when a negative pressure is generated by the vacuum means (not shown) ink mist which is generated from ink droplets impacting on the recording surface is collected through the hole and the hose. The interconnecting tube conveys the collected ink mist back to the ink supply tank (not shown) where it is reused for printing on the media. Although a plurality of various shapes of holes can be used in the preferred embodiment of this invention, hole 84 has a truncated pyramid-shaped cross section. The base of the cone is disposed on the slanting surface 82. A porous layer 90 is deposited on the side walls of hole 84. The porous layer is fabricated from a material which has a liquid absorbing characteristic. As such, ink mist which is pulled into the hole by the vacuum connected to hose 88 is deposited on the absorbing layer. A tube 92 is coupled to the porous layer. A hose 94 couples the tube to a vacuum system (not shown). When a negative pressure is applied by the negative pressure system, ink mist which is collected in the porous layer is pulled through the hose and can be recirculated to the ink supply reservoir for reuse. It ought to be noted that the absorbing layer 90 need not be positioned within the opening 84. In other words, the fog scoop 42 can be operated without the presence of the absorbing layer.

Figure 3:
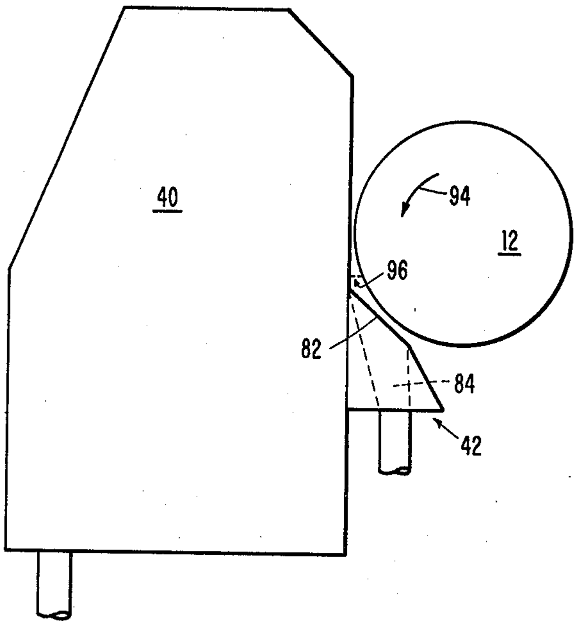
FIG. 3 shows an alternate configuration where the ink mist collector is mounted below the zone whereat the ink droplets impact the recording surface in the direction of drum rotation.

FIG. 3 shows an alternate configuration for the environmental box 40 and the fog scoop 42. In this configuration, the drum 12 is rotating in a counterclockwise direction shown by arrow 94. The fog scoop 42 is coupled to the enviromental box 40. However, the fog scoop 42 is disposed below the zone whereat ink droplets 96 contact the media mounted to the drum. It should be noted in FIG. 3 that the surface 82 slopes in the direction of drum rotation. As such, ink dust which is generated from the droplets are collected through opening 84 and returned to the ink supply system.

Figure 4:
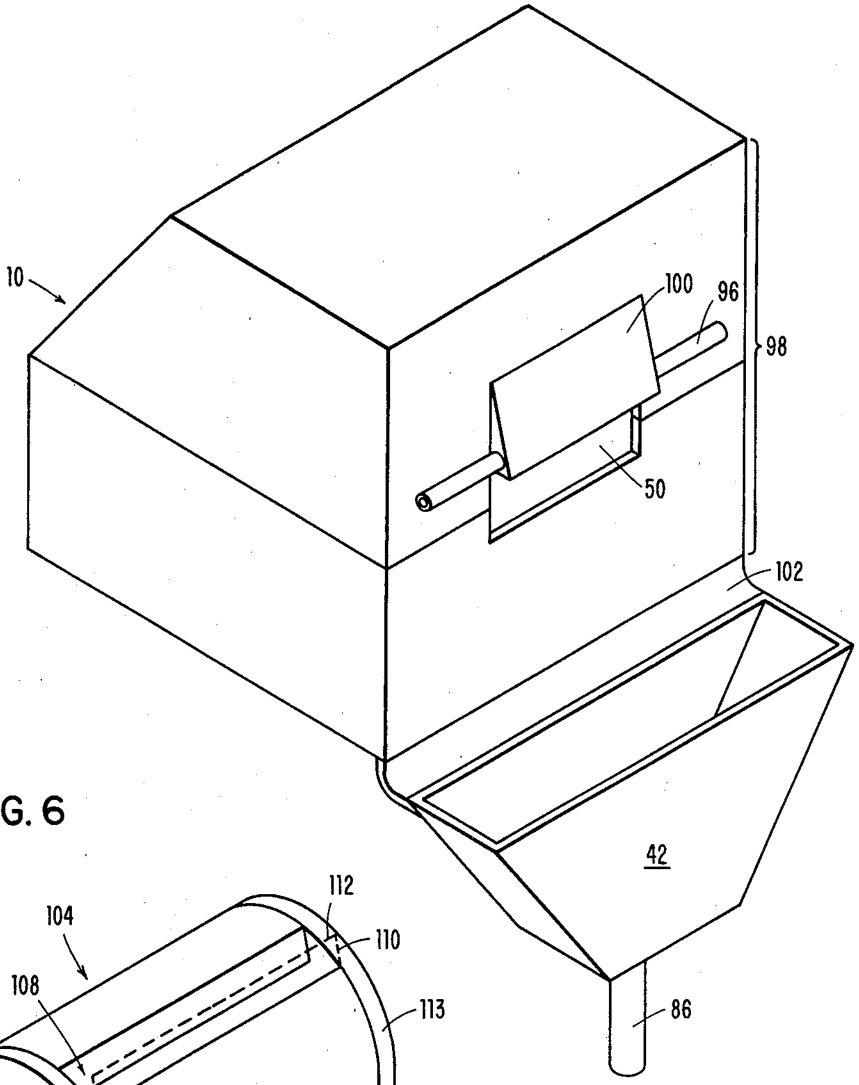
FIG. 4 shows another configuration wherein the mist collector is mounted downstream from the zone whereat the ink droplets contact the print media and an ink mist absorbing surface is mounted upstream from the ink droplet contacting zone.

FIG. 4 shows an alternate embodiment according to the teaching of the present invention. In describing FIG. 4, elements which are identical to previously defined elements will be identified by the same numeral. In FIG. 4, the environmental box 10 is mounted to enclose the print assembly in a manner similar to that described above. Droplets (not shown) for printing on the media carried by drum 12 (not shown) are emitted through slot 50. A hollow rod-like member 96 runs traversely to frontal member 98 of the environmental box. A porous wedge-shaped member 100 is mounted on the hollow rod-like member. The porous member is fabricated from a material which has liquid absorbing characteristics. The porous member is disposed relative to opening 50. The fog scoop 42 is mounted below the opening 50. A channel-shaped member 102 interconnects frontal member 98 with the fog scoop 42. The drum carrying the recording media (not shown) rotates in a counterclockwise direction and is orientated between hole 50 and the opening in fog scoop 42. As such, ink droplets emerging from hole 50 prints on the recording media. Ink dust collected by porous plate 100 is pulled away by the vacuum system attached by way of a flexible tube to hollow rod-like member 96. As before, the negative pressure system (not shown) which is coupled to hose 86 pulls the settled ink which is recirculated for reuse into the ink supply reservoir.

It ought to be noted at this point that the fog scoop is mounted so that it is transported by carriage assembly 20. Although this is the preferred embodiment according to the teaching of this invention, another arrangement is that the fog scoop is mounted in a fixed position. The preferred position would be relative to the zone whereat droplets emerging from hole 50 impinges on the recording surface carried by drum 12. As before, the fog scoop would be disposed in the same direction as the recording surface motion from the impact zone in the direction of drum rotation. It is therefore obvious from the description so forth, that the fog scoop may be mounted in a stationary orientation or an orientation where it moves relative to print assembly 22. Of course, if the means which support the printing surface does not move or the print assembly does not move relative to the print record, then the fog scoop is still effective as a means for capturing ink dust generating from droplets impacting on the print recording surface.

Figure 5:
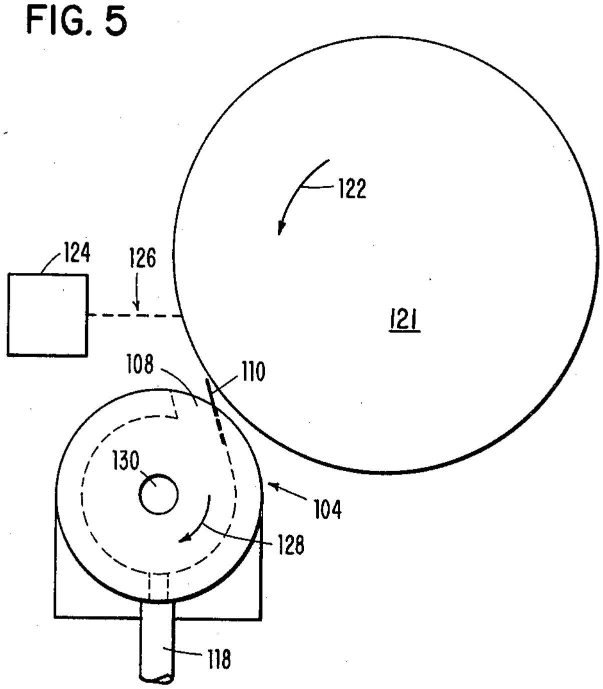
FIG. 5 shows a side view of the centrifugal ink mist collector disposed downstream from the zone where ink droplets contact the recording media.
Figure 6:
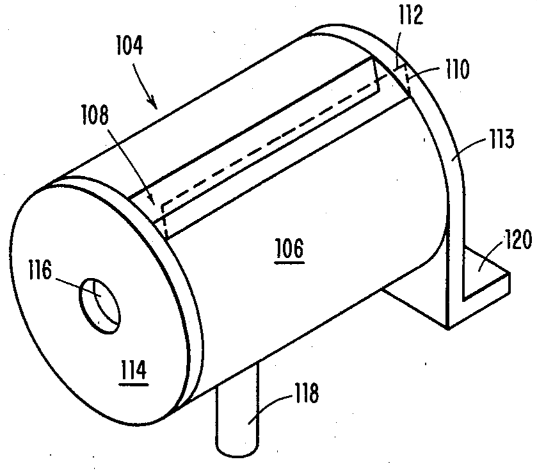
FIG. 6 shows an isometric view of the centrifugal ink mist collector.

Turning now to FIGS. 5 and 6, respectively, another type of ink mist collector is shown. This type of ink mist collector identified by numeral 104 is called a centrifugal ink mist collector. As will be explained subsequently, the centrifugal force associated with a body traversing a circular path is used to separate the ink which intermingles with air. FIG. 5 shows a configuration for an ink jet printing system while FIG. 6 shows a perspective view of the centrifugal ink collector. As before, common elements in FIGS. 5 and 6 will be identified with common numerals. The centrifugal mist collector 104 is fabricated from a cylindrical tube 106. A longitudinal slot 108 is fabricated in the surface of the cylindrical tube. The slot has the same thickness as the thickness of the material forming the side wall of the cylindrical tube. As such, the internal portion of the tube is interconnected to the external surface of the cylindrical tube. A collecting plate 110 is fastened to the inside surface of slot 108. In the preferred embodiment of this invention, edge 112 of the collecting plate extends above the outer surface cylindrical tube 106. As will be described hereinafter, with edge 112 extending above the external surface of the cylindrical tube, the edge can be disposed relatively close to the rotating surface of a drum supporting a print media and is more efficient in collecting fog which enters into the centrifugal fog collector through opening 108. Disc shape members 114 and 113, respectively, are fastened one on opposite sides of the cylindrical tube to form a closed container. A pair of holes, one of which is shown in FIG. 6 and identified by numeral 116, is bored in the end members. As will be described subsequently, as the drum rotates relative to collecting plate 110, a layer of air mixes with the ink mist generating from printing. The mist and air enters into the centrifugal fog collector 104 through opening 108. However, since the ink is heavier than the air, the ink under the influence of centrifugal force moves towards the center of the tube while the air escapes through the holes in the end members. Ink which is collected in the centrifugal fog collector is removed through hose 118. End disk 113 is fitted with a bracket section 120 which can be used for mounting the centrifugal fog scoop relative to a media where ink is impacting for writing. A similar bracket can be attached to end disk member 114.

In FIG. 5, the centrifugal fog scoop 104 is mounted relative to a drum 121. As before, a recording sheet (not shown) is coupled to the surface of the drum and rotates therewith in the direction shown by arrow 122. A print assembly 124 generates a plurality of ink droplets identified by numeral 126. The ink droplet 126 impinges on the recording surface to generate readable material thereon. As before, ink mist generated from droplets impacting on the surface of the recording surface (not shown) is collected by the collecting plate 110. The ink mist and a mixture of air enters through slot 108 into the centrifugal fog scoop. Due to the cylindrical shape of the fog scoop, the mixture of air and ink mist is forced into a circular path shown by arrow 128. As a result of the centrifugal force which is exerted on the mixture, the heavy particles of ink falls to the center of the tube while the air is forced to the outside and escape through an opening 130. The collected ink can be removed from the centrifugal ink mist collector by means of hose/cube assembly 118.

Although the invention has been particularly shown and described with reference to a preferred embodiment thereof, it will be understood by those skilled in the art that various changes in form and details may be made therein without departing from the spirit and scope of the invention.

What is claimed is:

1. Apparatus for use with an ink jet printer to collect ink mist generated by print fluid droplets contacting the surface of a recording media, said apparatus comprising:
   - a substantially closed container means having an inlet opening therein and operable to collect the ink mist, said container means having its inlet opening disposed relative to a zone whereat droplets of print fluid impact the recording media; and
   - means coupled to the container means and operable to extract the ink mist therefrom.

2. The apparatus of claim 1 further including means to recirculate the ink mist to a print fluid reservoir for reuse.

3. The apparatus of claim 1 wherein the means for extracting the ink is a hose; and
   - a vacuum pump coupled to said hose.

4. The apparatus of claim 1 further including a closed container means disposed to encase the components of the ink jet printer head used to generate and to influence the droplets; and
   - a pressure means coupled to said closed container means, said pressure means being operable to pressurize the closed container means so that contaminants are being excluded therefrom.

5. An improved nonimpact printing system comprising in combination:
   - a cylindrical drum mounted for rotation about its longitudinal axis;
   - a recording media mounted to the surface of said drum and operable to rotate therewith;
   - a print head disposed relative to said drum and operable to generate ink droplets for printing on the recording media;
   - an environmental box means mounted to enclose the print head;
   - a pressure means operable to pressurize the box above that of the ambient atmosphere outside the box means so that contaminants are being excluded therefrom; and
   - a substantially closed container means mounted to the box and operable to collect ink mist generated from ink droplets impacting on the recording media.

6. The nonimpact printing system of claim 5 further including means for extracting the ink mist from the container means.

7. In a nonimpact printing system wherein an indicia recording sheet is mounted to the surface of a rotating drum, a drop generator disposed relative to the drum and operable to produce a plurality of ink droplets, and means for influencing the droplets to enable printing on the recording sheet, an improved apparatus for controlling contaminants comprising:
   - an ink mist collecting scoop having an inlet opening therein, said scoop disposed relative to the drop generator with the inlet opening positioned upstream from a zone whereat the ink droplets contact the recording sheet in the direction of drum rotation.

8. The apparatus of claim 7 further including a vacuum suction means coupled to the collecting scoop and operable to extract ink mist therefrom.

9. In a nonimpact printing system wherein an indicia recording sheet is mounted to the surface of a rotating drum, a drop generator disposed relative to the drum and operable to produce a plurality of ink droplets, and means for influencing the droplets to enable printing on the recording sheet an apparatus for controlling contaminants comprising:

an environmental box mounted to encase the drop generator and the means for influencing the droplets, said environmental box having an opening to allow the emission of ink droplets;

an ink mist scoop mounted to the environmental box, said scoop having an opening orientated to collect ink mist resulting from droplets impacting the recording sheet;

a source of positive pressure means coupled to the environmental box and operable to pressurize said box to exclude contaminants; and a source of negative pressure means coupled to the ink mist scoop and operable to extract ink mist from said scoop.

10. The apparatus of claim 9 wherein the environmental box includes a shell having a substantially rectangular base enclosure portion, said base enclosure portion having a bottom member with a plurality of side members extending upwardly;

a cover enclosure portion having at least a top member with a plurality of side members extending downwardly; and a locking means operable to lock the base enclosure portion and the cover enclosure portion to form a unified enclosure.

11. The apparatus of claim 9 wherein the ink mist scoop includes an elongated block member having an opening therein with at least one surface sloping in the direction of drum rotation, said opening extending from the sloping surface and running traversely to the longitudinal dimension of said block.

12. The apparatus of claim 11 wherein the opening includes a truncated pyramid-shaped cross-section, or truncated pyramid-shaped with the base of the conical cross-section disposed in the sloping surface of the block.

13. The apparatus of claim 12 further including an ink mist absorbing layer disposed on one or more surface of the opening.

14. The apparatus of claim 13 further including suction means coupled to the absorbing layer and operable to extract ink mist collected in said layer.

15. A centrifugal fog collector adaptable for use with an ink jet printing system comprising:

a cylindrical tube having a longitudinal slot therein;

a collecting plate coacting with the slot to form an entry for collecting ink mist;

a pair of end members one of each joined to opposite ends of the tube to form a closed container.

16. The centrifugal fog collector of claim 15 further including a pair of holes one of each disposed in each of the end members.

* * * * *